H. JACOB.
ADJUSTING DEVICE FOR OPTICAL INSTRUMENTS.
APPLICATION FILED JUNE 19, 1912.
1,085,612.
Patented Feb. 3, 1914.
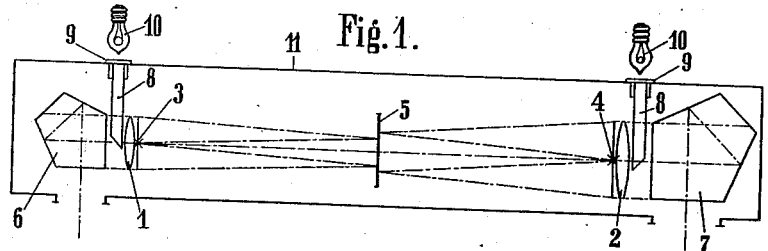
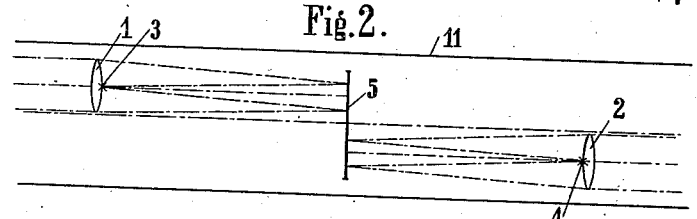
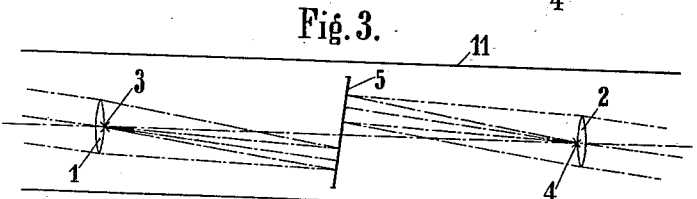
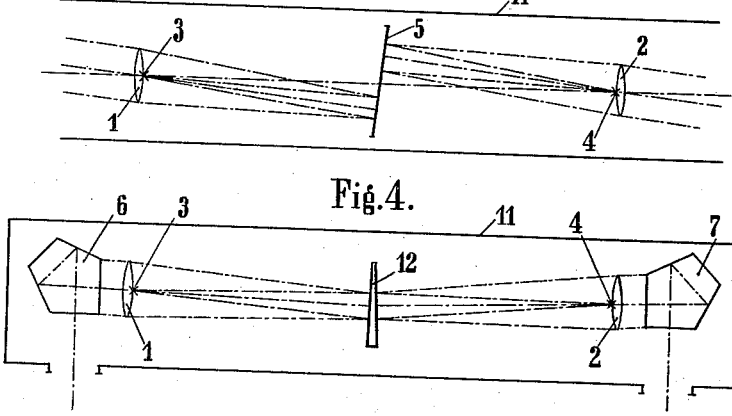
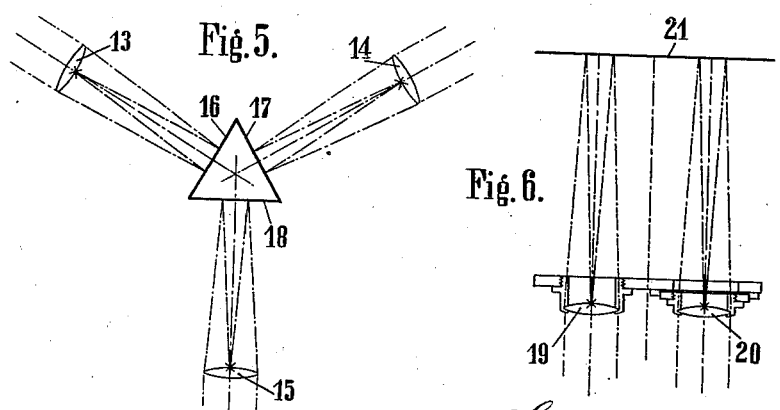

UNITED STATES PATENT OFFICE.

HEINRICH JACOB, OF STEGLITZ, NEAR BERLIN, GERMANY, ASSIGNOR TO THE FIRM OF OPTISCHE ANSTALT C. P. GOERZ AKTIENGESELLSCHAFT, OF FRIEDENAU, NEAR BERLIN, GERMANY.

ADJUSTING DEVICE FOR OPTICAL INSTRUMENTS.

1,085,612.  Specification of Letters Patent.  Patented Feb. 3, 1914.

Application filed June 19, 1912. Serial No. 704,508.

*To all whom it may concern:*

Be it known that I, HEINRICH JACOB, a citizen of the German Empire, and resident of Steglitz, near Berlin, Germany, have invented certain new and useful Improvements in Adjusting Devices for Optical Instruments, of which the following is a specification.

This invention relates to a device for ascertaining if the elements of an optical instrument such as a telemeter are in correct position.

The invention is illustrated on the accompanying drawing.

Figure 1 shows an embodiment of the invention adapted for being used in the adjustment of telemeters. Figs. 2 and 3 show diagrammatically the effect of displacements of the elements of the adjusting device. Fig. 4 is a further embodiment showing a modification of the device illustrated in Fig. 1. Fig. 4ᵃ shows an alternate form of wedge shaped mirror similar to the one shown in Fig. 4. Fig. 5 shows diagrammatically an adjusting device with three collimator-objectives. Fig. 6 is an embodiment of the adjusting device with two collimator-objectives in front of a single reflecting surface.

In the embodiment shown in Fig. 1 two collimator-objectives are designated 1, 2. These two objectives are provided with adjusting marks 3, 4 respectively.

5 is a double sided reflecting mirror between said two objectives at a distance from each objective of substantially half its focal length.

6 and 7 are two penta prisms on the outsides of the two objectives.

8 are illuminating prisms for throwing the rays of light from lamps 10 on the adjusting marks 4. Between prisms 8 and lamps 10 glass windows 9 are provided which are preferably made from colored glass, the colored glass only allowing light of substantially definite length of wave to pass. The optical elements are mounted within a casing 11 having openings in front of the penta prisms 6, 7.

The function of the described adjusting device is as follows: The adjusting marks 3, 4 on ground of their being illuminated by lamps 10 by means of prisms 8 emit rays of light toward mirror 5 which are reflected toward the objectives 1, 2 which they leave as parallel pencils. Such parallel pencils of rays enter the penta prisms 6, 7 and leave same again as parallel pencils. If the device is brought into position opposite a base line telemeter the images of the adjusting marks 3, 4 produced by the telemeter must coincide with each other if the telemeter is adjusted to a distance equal to infinite provided that the telemeter is correctly adjusted.

A displacement of the elements of the adjusting device does not influence the parallelism of the direction of the pencil rays leaving the adjusting device. This appears from Figs. 2 and 3 showing all kinds of possible displacements of the optical elements of the adjusting device at an exaggerated scale. It will be noted that the rays emitted from centrally arranged adjusting marks always leave the objectives at right angles to the opposite mirror face.

It is advisable to make the objectives 1, 2 of substantially equal focal lengths in order to make equal adjusting marks appearing equal when observed by the telemeter. However it is not essential to use objectives of equal focal length. The objectives may also be given different focal lengths especially if the dimensions of the adjusting marks are suitably chosen in dependence therefrom. It is not necessary to make the distance of the mirrors from the adjusting marks absolutely equal half the focal length of the objectives but only nearly so.

If the windows 9 are made of colored glass as above suggested the objectives 1, 2 need not to be achromatic without materially affecting the sharpness of the image. This does not only simplify the construction but at the same time makes the instrument less susceptible of dejustment because simple collecting lenses are less variable than achromatic compound lenses.

The embodiment shown in Fig. 4 is distinguished from that of Fig. 1 only thereby that instead of a mirror with two parallel reflecting surfaces a wedge shaped body 12 is provided. This wedge shaped body is assumed as being rotatable about the connecting line of the centers of the objectives 1, 2 and allows compensation for incorrectness of the penta prisms 6, 7 by rotation about its axis. The wedge may be provided with reflecting surfaces and may for this purpose be made of metal. It may however also be made of glass and provided on one side with a double sided reflecting layer, the wedge effect in this case being produced by refraction of the rays of light within the glass. A wedge of this kind is illustrated in Fig. 4ᵃ and designated 12ᵃ. This wedge 12ᵃ has a reflecting coating only on one side (the left hand side of the drawing), so that rays coming from the left side are reflected from such coating in the same way as indicated in Fig. 4 of the drawing. The rays coming from the right side enter into the glass wedge and are only reflected from the coated back (left hand) side of the wedge. The deviation of the ray pencils on both sides of the wedge, therefore, is produced by refraction of the rays of light within the glass.

In the embodiment illustrated in Fig. 5 there are provided three objectives 13, 14, 15 having a certain angular distance from each other. Between the objectives a triangular body with reflecting surfaces 16, 17 and 18 is provided; the several pairs of adjacent reflecting surfaces including angles with each other which are the supplements to the angles included by the axes of the objectives in front of the respective pairs of reflecting surfaces.

A device of this kind may be used for adjusting an angle measuring instrument or other instrument having three fixed telescopes including definite angles with each other or one telescope rotatable over a scale plate. By inserting the device of Fig. 5 into the center of such angle measuring instrument or near such place, it can be ascertained if the fixed telescopes are permanently in correct position including with each other the prescribed angles or if the graduation of the scale indicating the position of the rotatable telescope is correct.

The principle of use of the device of Fig. 5 is substantially the same as that of Fig. 1 and is based on the invariability of the position of reflecting surfaces 16, 17, 18 with regard to each other and on the independency of the direction of the ray pencils leaving the objectives 13, 14 15 from the position of such objectives with relation to the reflecting member 16, 17, 18.

The embodiment of Fig. 6 shows two objectives 19, 20 in front of one single reflecting surface 21. This form of adjusting device is especially suitable for the examination and adjustment of binocular telescopes. The device is in this case adapted to the examination of telescopes of differently spaced objectives by simple lateral displacement of the collimator objectives 19, 20.

What I claim is:—

1. In an adjusting device for optical instruments a plurality of collimator objectives, adjusting marks in fixed connection therewith and a reflecting surface in front of each objective at a distance substantially equal to half the focal length of the objective.

2. In an adjusting device for base line telemeters two objectives arranged substantially coaxially with each other adjusting marks in fixed connection therewith, reflecting surfaces between said two objectives one in front of each objective at a distance substantially equal to half its focal length and coöperating therewith and a reflecting member on the outside of each of said two objectives adapted to deviate rays of light coming from said adjusting marks and reflected by said reflector so as to leave said reflecting members on the outside of the objectives in parallel direction.

3. In an adjusting device for base line telemeters two objectives arranged substantially coaxially with each other, adjusting marks in fixed connection therewith, a wedge shaped body between said two objectives adapted to be rotated about the connecting line of the centers of the objectives having reflecting surfaces turned toward each of said two objectives, each of said reflecting surfaces at a distance from the objective coöperating therewith substantially equal to half its focal length and a reflecting member on the outside of each of said two objectives adapted to deviate rays of light coming from said adjusting marks and reflected by said reflectors so as to leave said reflecting members on the outside of the objectives in parallel direction.

In testimony whereof I have signed this specification in the presence of two subscribing witnesses.

HEINRICH JACOB.

Witnesses:
 WOLDEMAR HAUPT,
 HENRY HASPER.